Patented Apr. 14, 1936

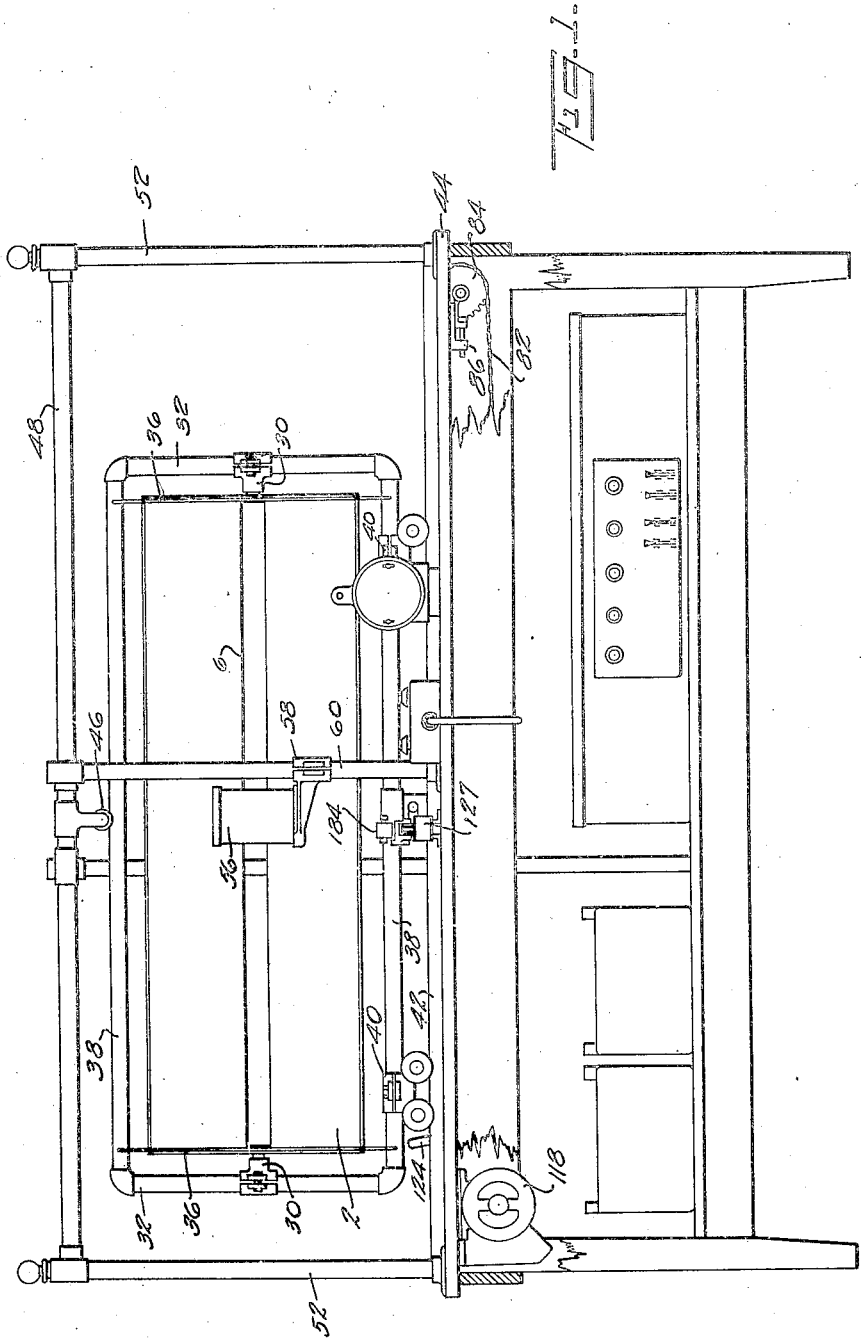

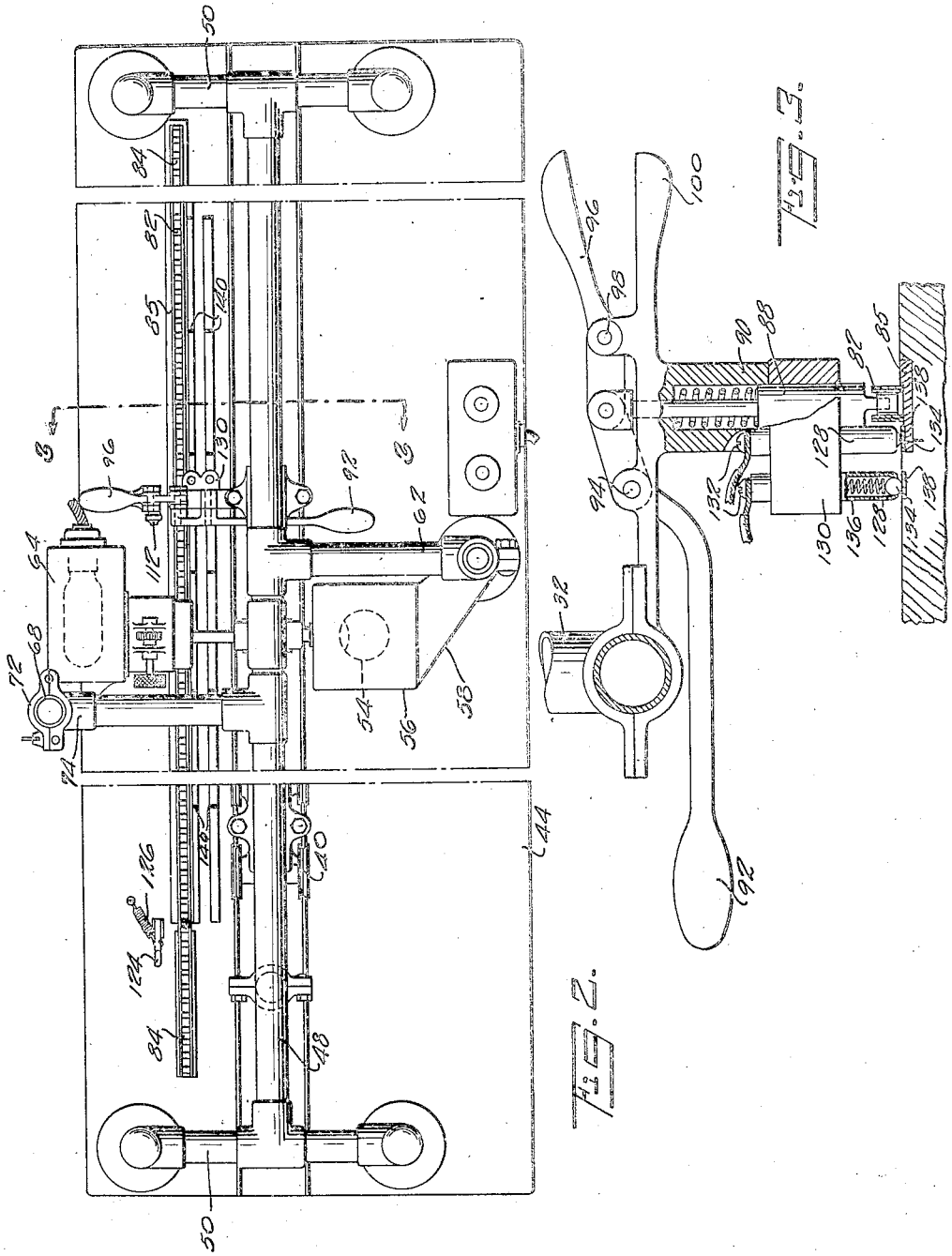

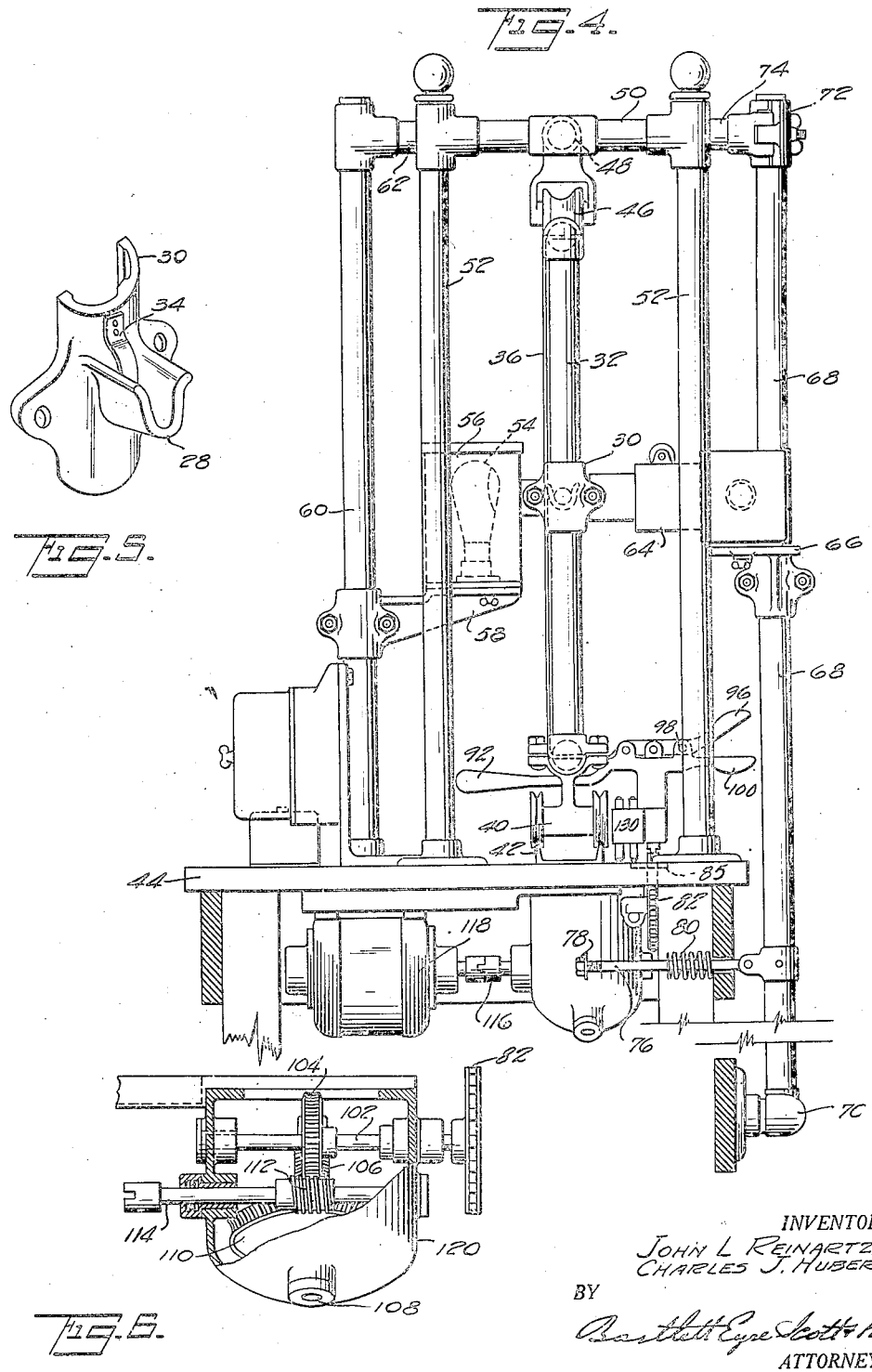

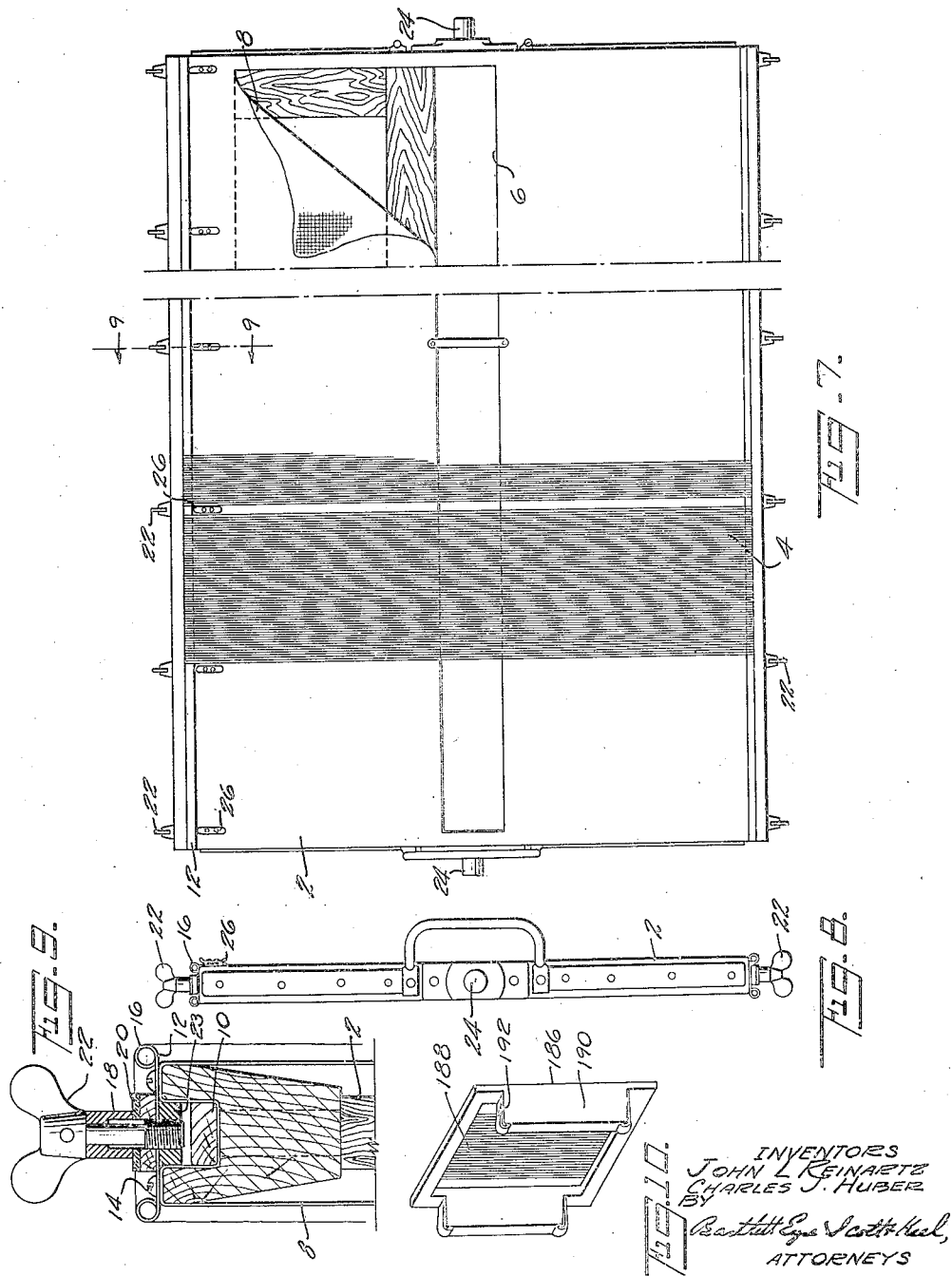

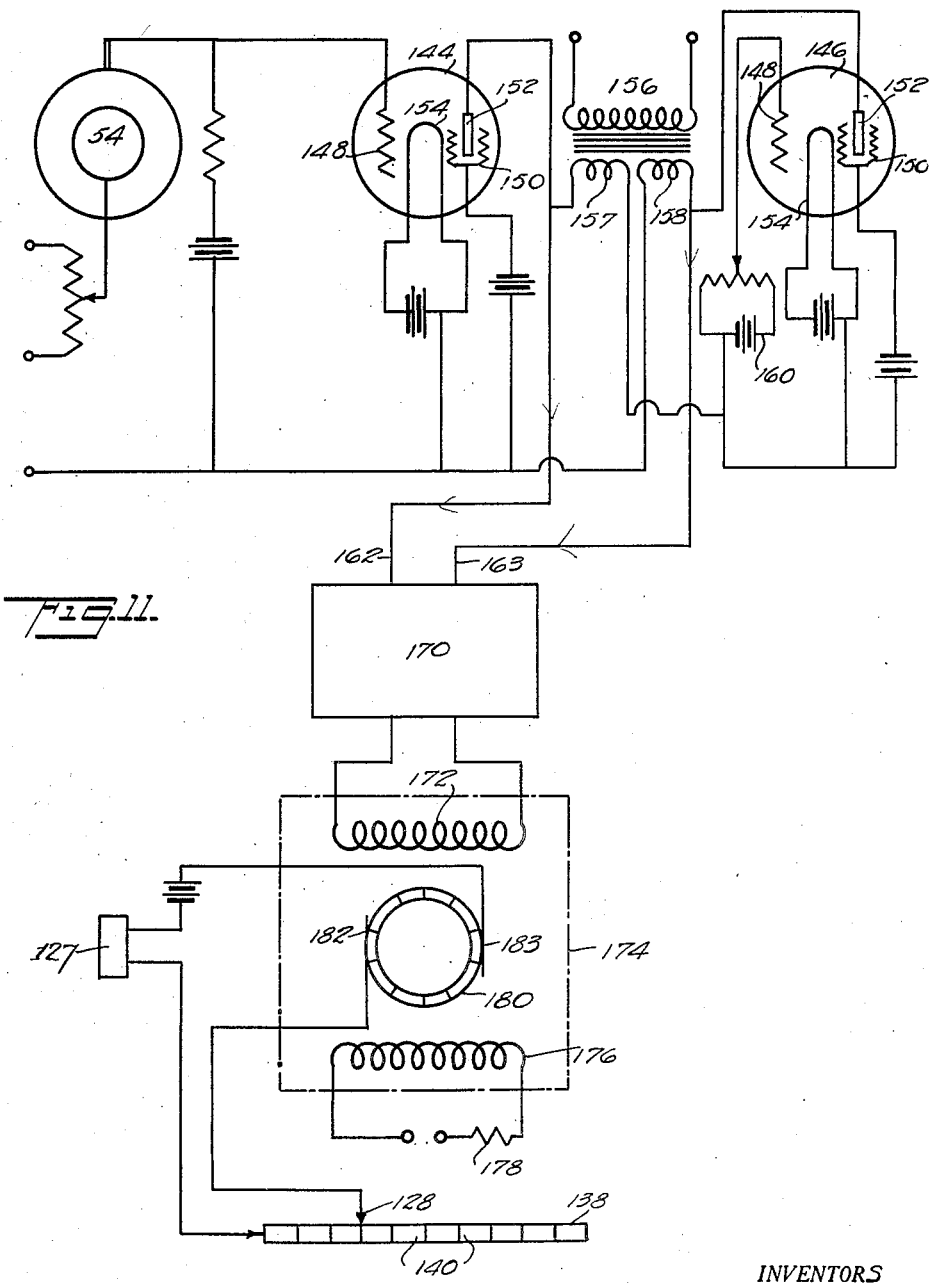

2,037,044

UNITED STATES PATENT OFFICE 2,037,044

METHOD OF AND APPARATUS FOR MEASURING THE EVENNESS OF MATERIALS

John L. Reinartz and Charles J. Huber, South Manchester, Conn., assignors to Cheney Brothers, South Manchester, Conn., a corporation of Connecticut Application February 26, 1930, Serial No. 431,654

12 Claims. (Cl. 88—14)

One method heretofore employed in evaluating silk yarn and other strands has been to arrange the strands on a board with a desired number of strands to the inch in a woven fashion alinement to give the vivid picture of the finished texture before manufacturing. Strands are thus brought before the eye in such a manner as to exhibit plainly any defects, such as unevenness, so that the strands may be evaluated in percentages by comparing with an assumed standard. Such evaluating depends entirely on the personality, keenness and experience of the observer.

One of the objects of the present invention is to provide a method of and apparatus for evaluating strands in which dependence for accuracy and reliability on the part of the human element is eliminated.

Another object of our invention is to provide a method of the character indicated which is reliable and accurate, and may be carried out easily, inexpensively and expeditiously.

Another object of the invention is to provide an apparatus of the character indicated, which is simple in construction and reliable in operation.

Still another important object of our invention is to provide a novel and improved apparatus and system for measuring minute electrical currents.

The several features of our invention, whereby the above-mentioned and other objects may be attained, will be readily understood from the following description and accompanying drawings, in which:

Figure 1 is a front elevation, partly in section, of an apparatus embodying certain features of our invention in their preferred form;

Fig. 2 is a plan view, on an enlarged scale and partly broken away, of the apparatus;

Fig. 3 is a detail sectional view taken on the line 3—3 of Fig. 2;

Fig. 4 is a right end view of the apparatus, partly in section;

Fig. 5 is a detail view in perspective of an examining board bracket;

Fig. 6 is a detail sectional elevation of certain driving mechanism of the apparatus;

Fig. 7 is a detail front view, partly broken away, of a strand examining board;

Fig. 8 is an end view of the same;

Fig. 9 is a detail sectional view, taken on the line 9—9 of Fig. 7;

Fig. 10 is a detail view in perspective of a component part of the apparatus hereinafter described; and Fig. 11 is a diagrammatical view of an electric circuit which is particularly adapted for use in our improved apparatus.

Our improved method and apparatus is adapted for use in measuring the evenness of strands, fabrics and various other materials. In measuring strands, the strands may be arranged on one side of a board transversely thereof in closely spaced relation with a predetermined number of strands to the inch. The board with the strands thereon is moved longitudinally at a constant speed past a light sensitive cell which is in circuit with a suitable amplifying device that greatly amplifies the electric impulses from the cell, and a suitable recording device is employed for recording these impulses. The light source which cooperates with the light sensitive cell may be so located as to reflect light from the material to the cell, in which case, the strands may be placed on a black or dark surface. Preferably, however, the light source is so located as to diffuse or transmit light through the strands to the light sensitive cell, and to permit this to be accomplished the board may be provided with a longitudinally extending slot in alinement with the source of light and the cell. We have provided a novel and improved amplifying circuit hereinafter fully described for amplifying the electrical impulses from the cell. The recording of the amplified electric impulses from the cell may be effected by means of a magnetic counter which is connected with a watt hour meter in the amplifying circuit. In place, however, of the watt hour meter and magnetic counter, a graphic recording watt meter may be employed. Preferably the measuring of the evenness of the strands by my improved method and apparatus is effected by comparing the strands with strands of a given standard, the apparatus recording the differences in the evenness of the strands plus or minus with the strands of the given standard. Thus with my improved method and apparatus the evenness of strands and other material may be measured without dependence on the human element for accuracy and reliability.

The apparatus illustrated in the drawings comprises a strand examining board 2 on which strands 4 are wound in groups or panels with the panels spaced slight distances apart and with the strands of each group arranged a certain number to the inch in woven fashion alinement to give the vivid picture of the finished texture before manufacturing.

The board 2 (Figs. 7 to 9) comprises a frame having a longitudinal slot 6 therein. The board is covered with cloth 8 so as to provide a smooth surface, the cloth being tightly secured on each longitudinal edge of the board by means of a strip 10 which is set into a longitudinally extending groove. Sheet metal strips 12 are secured by screws 14 to the longitudinal edges of the board, with their ends rolled to provide beads 16 which project beyond the sides of the board so that upon winding the strands on the board the stretches thereof extending between the projecting beads on the strips 16, are spaced from the sides of the board. After the strands have been wound on the board, the portions thereof extending over each of the longitudinal edges of the board are clamped between a strip 18 and a rubber pad 20, the clamping being accomplished by means of wing screws 22 which extend through apertures in the strip 18 and are screw-threaded into a strip 23 secured to the underside of the sheet metal strip 16. The ends of the board are provided with trunnions 24 secured thereto in axial alinement.

To wind the strands on the board the wing screws 22 and the clamping strips 18 are first removed, and then the board may be placed in a machine of the type of the one described and claimed in U. S. Letters Patent to F. J. Schmutz, No. 1,448,980, dated March 20, 1923. In winding each strand on the board with this machine, the end of the strand is secured to the board by means of a clip 26 and then the board is revolved by the machine about its longitudinal axis, the strand being guided and moved longitudinally of the board so as to cause the strand to be evenly wound on the board with the desired number of strands to the inch. When each strand has been thus wound on the board, its outer end is secured to one of the clips 26. The board may then be removed from said patented machine and the clamping strips 18 applied as above described. The stretches of the several strands at one side of the board are then cut off.

The board with the strands extending over but one side thereof, may then be mounted in the apparatus illustrated in the drawings (Figs. 1 to 5) by inserting the trunnions 24 in U-shaped seats 28 formed on brackets 30. These brackets are split so as to embrace uprights 32 to which they are secured. The board is held from axial movement in the seats 28 by a leaf spring 34, (Fig. 5) having one end secured to the bracket 30 and its other end engaging the end of the associated trunnion 24. The board is securely held upright by spring wires or rods 36 extending tightly over the front side of the board at the ends thereof and having their ends secured to horizontal rods or pipes 38 connecting the ends of the uprights 32. The uprights 32 and the horizontal rods 38 constitute a frame or carrier for the board. This frame or carrier is mounted on four-wheeled trucks 40 which ride on the upturned edges of a channel iron 42 secured on the top of a table 44. This arrangement permits the board and its carrier to be moved longitudinally. The carrier is held from lateral tipping movement by a flanged roller 46 which engages the upper frame or carrier member 38. The roller 46 is mounted on a hanger secured to a rod or pipe 48 which has its ends secured to cross members 50 which in turn have their ends secured to uprights 52 that are secured to the top of the table 44.

A photo-electric cell 54 and its shield 56 is mounted in front of the board with its slot opposite to the center of the slot 6 in the board, the slot in the cell shield being spaced a slight distance from the stretches of strands on the board. The photo-electric cell with its shield is mounted on a bracket 58 secured to a centrally located upright 60 having its lower end secured to the table 44 and its upper end secured to the outer end of a forwardly projecting frame member 62 having its rear end secured to the frame member 48. At the rear side of the strand examining board 2 and in alinement with the photo-electric cell and the slot 6 in the board, a suitable light projector 64 is mounted on a bracket 66 secured to an upright 68 having its lower end pivoted at 70 on a bracket projecting from the rear side of the table 44 and its upper end detachably secured by a clamp 72 to a frame member 74 projecting rearwardly from the horizontal frame member 48. The frame member 68 is thus pivotally mounted at its lower end and detachably secured at its upper end so as to permit it, together with the light projector 64, to be swung rearwardly to allow for insertion and removal of the strand examining board 2 in its carrier. A rod 76 has one end pivotally connected with the upright and its other end extends through a guiding opening in a side of the supporting table 44. A nut and washer 78 is secured on the free or inner end of the rod 76, and a spring 80 is loosely coiled about the rod adjacent the side of the table. With this construction, when the upright 68 is swung outwardly, the nut and washer 78 by engagement with the coiled spring 80 serve as a buffer to yieldingly limit the outward movement of the upright 68 and thus obviate the danger of causing undue shock or jar to the light projector 64.

The means for moving the board with its carrier longitudinally, comprises a sprocket chain 82 which passes over the sprockets 84 mounted on suitable brackets on the underside of the top of the table 44. The upper stretch of the sprocket chain slides on a bar 85 set into the top of the table. Any suitable takeup device 86 may be provided for adjusting the right hand sprocket longitudinally of the table to take up slack in the chain.

The board carrier may be detachably secured to the chain 82 by means of a downwardly spring-pressed plunger 88 (Fig. 3) which extends through an aperture in a block 90 secured to the lower horizontal member 38 of the board carrier. The lower end of said spring-pressed plunger 88 is adapted to engage between the pivots of the links of the chain 82. The plunger is adapted to be lifted to move its lower end out of engagement with the carrier chain to stop the movement of the carrier, by means of a lever 92 which is pivoted at 94 on the block 90, and has the end of its rear arm pivotally connected with the upper end of the plunger and its other arm extended forwardly beneath the board carrier so as to permit it to be conveniently grasped by the hand of the operator and depressed to retract the plunger 88. In order that the plunger may also be retracted by the operator while standing at the back of the machine, a rearwardly extending lever 96 is pivotally mounted at 98 on the block 90 and has the inner end of its forward arm pivotally connected with the upper end of the plunger 88 and its other end extended over a hand grasp 100 on the block 90. With this construction it will be apparent that at any time, the travel of the board may be stopped and started at the will of the operator.

The left-hand sprocket 84 is driven so as to drive the chain, by means of a shaft 102 (Fig. 6)

on which it is mounted and which is driven through a worm wheel 104 secured thereon and engaged by a worm 106 on a shaft 108 which in turn carries a worm wheel 110 that is driven by a worm 112 carried by a drive shaft 114. The drive shaft 114 is coupled at 116 to the shaft of an electric motor 118. This gearing is enclosed by a suitable oil case 120 secured on the underside of the table 44.

The board carrier is carried by the sprocket chain 82 from the left to right of the apparatus viewing Fig. 1, and when it reaches the limit of its advancing movement the head of a screw 112 (Fig. 2) on the plunger block 90 engages the upper end of a lever 124 which projects upwardly through a slot in the top of the table 44 and swings the lever therewith against the tension of a spring 126 connected with the lever. This lever 124 is the shifting lever of a mercury or other switch in circuit with the driving motor 118 and when the lever is thus moved by the screw head 112, the switch is opened and thus the operation of the driving mechanism for the board carrier comes to rest. When the board carrier is retracted or moved in the opposite direction by the operator, which he may do after disconnecting the plunger 88 from the carrier chain, the spring 126 swings the lever 124 in the opposite direction to again close the motor circuit and thus again render the driving mechanism for the sprocket chain operative.

In circuit with a magnetic counter 127 (Fig. 11), hereinafter described, are two contact members 128 (Figs. 3 and 4) that are mounted in a block 130 of insulating material. The upper ends of the contact members 128 carry binding screws 132 for connection with the wires of the circuit and a contact ball 134 extends into an axial bore in the lower end of each contact member and is pressed downwardly by means of a coiled spring 136.

The contact balls 134 ride on contact strips 138 set into the top of the table 44. The contact strips 138 are electrically connected so that when the balls are in contact therewith, the circuit through the magnetic counter 127 is closed. The surfaces of the contact strips 138, however, are interrupted by pieces of insulating material 140 (Fig. 2) so that as the balls run over these pieces of insulating material said circuit is opened. These pieces of insulating material 140 are suitably arranged so that as the last strand of each group or panel of strands passes the photo-electric, the circuit is opened but is again closed as the foremost strand of the next group or panel comes opposite the photo-electric cell.

In the circuit illustrated in Fig. 11, electron discharge tubes 144 and 146 which may be radio tubes of the type known as UX222, are employed each of which has a control grid 148, a screen grid 150, an anode plate 152 and a filament 154. The grid 148 of the tube 144 is connected with the photo-electric cell 54 so that light variations falling on the cell causes a variable current through said grid.

A transformer 156 through its two secondaries 157 and 158 supplies the two tubes 144 and 146 with plate supply currents. The secondary 157 has one of its leads connected to the plate 152 of the tube 144, and its other lead to the filament 154 of tube 146; and the secondary 158 has one of its leads connected to the plate 152 of the tube 146, and its other lead to the filament 154 of the tube 144. A potentiometer 160 is provided between the grid 148 of the tube 146 and the secondary 157.

When a current flows between the filament 154 of the tube 146 and the plate 152 of the tube 144, it is balanced by a similar flow between the filament 154 of the tube 144 and the plate 152 of the tube 146. When a voltage is set up in the grid 148 of the tube 144 by the action of light in the photo-electric cell 54, this balance is upset and similar voltage must be set up in the grid 148 of the tube 146 to regain this balance. This may be accomplished by means of the potentiometer 160.

The plates of the tubes 144 and 146 are connected through leads 162 and 163 to a suitable amplifying circuit or so-called power pack of any standard make which when plugged into a light socket from which 110 volts plus and minus alternating current is applied, it will first change the 110 volts to 400 plus or minus and then rectify it to make it 400 volts direct current and subdivide this 400 volts through suitable resistors to obtain 45 and then 45 plus and minus 90 and 400 volts. This amplifying unit is indicated at 170. After passing through the amplifying unit 170 the current flows through a winding 172 in a watt hour meter 176, while the other winding 176 of the watt hour meter is supplied from an external source of current through a resistance 178. The rotor of the watt hour meter will revolve only when current is supplied to the winding 172 from the amplifying unit 170 and in direct proportion thereto. Attached to the meter rotor shaft is a commutator 180 with which brushes 182 and 183 are in contact. These brushes are connected with the magnetic counter 127 hereinbefore referred to. The commutator may have ten segments so that one revolution will transmit ten electrical impulses to the counter 172.

In using our improved apparatus, a grid frame 186 (Fig. 10) may be employed on which are secured copper wires 188. These wires should correspond in size to the standard of the particular size or grade of strands to be measured. For example if it is desired to measure the evenness or uniformity of 1½ silk, these wires should be of .0025 of an inch in diameter which is the nearest equivalent to this grade of silk, the latter being approximately .00217 of an inch in diameter. The grid frame is provided with rearward projections 190 having spring clips 192 on their ends so as to permit the projections 190 to be inserted in one end of the strand examining slots 6 and the grid held therein by said clips 192.

In measuring or evaluating groups or panels of strands arranged on the examining board as above described, this copper wire grid frame 186 is first positioned in the slot 6 of the examining board and the board moved by the means above described between the photo-electric cell and the light projector from right to left. While the frame 186 is thus presented to the photo-electric cell, the potentiometer 160 is adjusted so as to set up the same voltage in the grid 148 of the tube 146 as is set up in the grid of the tube 144 by the action of light diffused through the spaces between the wires of said frame in the photo-electric cell. In this way the rotor of the watt hour meter is brought to a stop or balanced position when this wire grid frame is used. A second wire grid frame is now inserted in the slot 6 of the board of such light filtration that when the frame is presented to the photo-electric cell, the rotor makes ten revolutions per minute.

By experiment it has been determined that .0035 copper wire meets this condition, where .00225 wire is used to balance the circuit. This grid frame we term the calibrating frame, and its purpose is to check the sensitivity of the unit.

The apparatus with the circuit thus adjusted is now ready to evaluate the yarn samples on the board, the board being moved as above described from right to left past the photo-electric cell at a uniform rate. During such movement of the board, the commutator of the watt hour meter will rotate in opposite directions proportionally to the differences in the evenness of the strands plus or minus the one hundred per cent. value of the original setting, and this would be recorded by the magnetic counter. If for example the rotor of the watt hour meter makes 2.5, 1.0 and .5 revolutions, respectively, then there would be a 25, 10 and 5 reading on the magnetic counter since the rotor, as above described, has ten segments, these readings would indicate that the strand samples were 75, 90 and 95 per cent. of a known standard represented by the 100 per cent. grid frame.

From the foregoing it will be apparent that with our improved apparatus and in accordance with our improved method silk or other strands may be accurately evaluated in percentages by comparing with an assumed standard.

It will be apparent that in place of the watt hour meter and magnetic counter, a graphic recording watt meter may be employed.

The balanced circuit connected with the photoelectric cell and the amplifying circuit 170 may be conveniently arranged in a shield or box 194 mounted on a shelf 196 beneath the table, the front of the box being provided with a control panel board 198 (Fig. 1). The several batteries indicated at 200 for the circuit, may also be mounted on its lower shelf. The watt hour meter 175 and the magnetic counter 127 may be mounted on the top of the table 44.

While the means and method described for measuring electrical currents are particularly adapted for use in connection with a photo-electric cell and in connection with an apparatus of the type illustrated in the drawings, it will be apparent that said circuit may be put to other uses where it is desired to measure minute electric currents. Also, while my improved apparatus is particularly adapted for measuring the evenness of strands in the form of yarn, it may in certain instances be used for measuring the evenness of cloth, and various other materials. In some instances, also, the light source may be so located that instead of diffusing or transmitting light through the material to the light sensitive cell, it may reflect light from the material to the cell. It will also be apparent that our invention permits various modifications to be made without departing from the spirit thereof or the scope of the appended claims.

What we claim is:

1. Apparatus of the class described having, in combination, a light sensitive cell, a light source, a support for strands arranged side by side in closely spaced relation with a definite number to the inch between said cell and light source whereby light from said source may diffuse through the spaces between the strands to said cell, and means for moving said support so as to successively present said strands to said cell and light source.

2. Apparatus of the class described having, in combination, a device comprising a light sensitive cell and a source of light, a support for strands arranged side by side in closely spaced relation with a definite number to the inch between said cell and light source whereby light from said source may diffuse through the spaces between said strands to said cell, means for relatively moving said device and support so as to cause said strands to be successively presented to said cell and light source, and means for measuring the variation in electrical impulses from said cell during said relative movement of said cell and strands.

3. Apparatus of the class described having, in combination, a device comprising a light sensitive cell and a source of light, a support for strands arranged side by side in closely spaced relation with a definite number to the inch between said cell and light source whereby light from said source may diffuse through the spaces between said strands to said cell, and means for relatively moving said device and support so as to cause said strands to be successively presented to said cell and light source, and a device in circuit with the cell for measuring the evenness of said strands with relation to a given standard.

4. The method of measuring the evenness of strands which comprises arranging the strands side by side in closely spaced relation with a definite number to the inch, passing the strands thus arranged between a light sensitive cell and a source of light whereby light from said source may diffuse through the spaces between the strands to said cell, and measuring the variation in electrical impulses from said cell during said movement of the strands.

5. Apparatus of the class described having, in combination, a light sensitive cell, a light source, a board having an elongated opening, means for securing strands on one side of the board across said opening with the strands arranged side by side in closely spaced relation with a definite number to the inch, and means for moving said board longitudinally between the cell and light source so that light from said source may diffuse through said slot and through the spaces between the strands to said cell.

6. Apparatus of the class described having, in combination, a board having a longitudinally extending opening, a carrier on which the board is detachably mounted, means for moving the carrier to move said board longitudinally at a uniform rate of speed, a light source arranged at one side of the board for directing a beam of light through the opening in the board, a light sensitive cell arranged adjacent the opposite side of the board, and means for securing strands on the side of the board adjacent said light sensitive cell with the strands arranged transversely of the board in closely spaced relation with a definite number to the inch, whereby light from said source is diffused through said opening and through the spaces between the strands.

7. Apparatus of the class described having, in combination, a support for a plurality of groups of strands spaced apart with the strands of each group arranged side by side in uniformly closely spaced relation with a definite number to the inch, a light sensitive cell, a light source, means for moving said support to successively present the groups and successively present the strands of each group to the cell and light source, a device in circuit with the cell for indicating variations in the electrical impulses from the cell, and means acting automatically during the movement of the support for closing the cell circuit as the foremost strands of each group are presented to the cell and for opening said circuit as the rearmost strands of each group pass said cell.

8. The method of comparing strands of an unknown standard with strands of a known standard, which comprises arranging the strands of the known standard in uniformly closely spaced relation with a definite number to the inch, passing these known strands thus arranged between a light sensitive cell and a source of light whereby light from said source may diffuse through the spaces between said strands to said cell, measuring the electrical impulses in the cell circuit during said movement of the known strands past said cell, similarly arranging the strands of the unknown standard and passing them between said cell and light source, measuring the electrical impulses in said cell circuit during said movement of the last-mentioned strands, and comparing the two measurements that are thus taken.

9. Apparatus of the class described having, in combination, a board having a longitudinally extending opening, a light source arranged at one side of the board for directing a beam of light through the opening in the board, a light sensitive cell arranged adjacent the opposite side of the board, means for securing strands on one side of the board with the strands arranged transversely of the board in closely spaced relation with a definite number to the inch, whereby light from said source is diffused through said opening and through the spaces between the strands to said light sensitive cell, and means for relatively moving the light sensitive cell and board in a direction transversely of said strands, said light source and cell being maintained in position with relation to each other so that the light diffused through said opening and through the spaces between the strands passes to said cell.

10. The method of measuring the evenness of strands which comprises winding a strand upon a board having a longitudinally extending slot so as to cause the stretches of the strand extending between the edges of the board to extend across said slot in closely spaced relation with a definite number to the inch, clamping the portions of the strand adjacent the edges of the board so as to hold the stretches of the strand on one side of the board in position, severing off the portions of the stretches of the strand extending over the other side of the board, and measuring the evenness of the stretches extending across the slot by relatively moving the stretches of the strand thus held on the board and a light sensitive cell and its light source whereby light from said source may diffuse through the spaces between the stretches to said cell, and measuring the variation in electrical impulses from said cell during said movement of the stretches and cell.

11. The method of measuring the evenness of a strand which comprises arranging stretches of the strand side by side in closely spaced relation with a definite number to the inch, relatively moving the stretches thus arranged and a light sensitive cell with its light source whereby light from said source may diffuse through the spaces between the strands to said cell, and measuring the variation in electrical impulses from said cell during said relative movement of the cell and stretches.

12. Apparatus of the class described having, in combination, a device comprising a light sensitive cell and a source of light, and a support for strands arranged side by side in closely spaced relation with a definite number to the inch, means for relatively moving said device and support so as to cause said strands to be successively presented to said cell and light source, and means for measuring the variation in electrical impulses from said cell during said relative movement of the cell and support.

JOHN L. REINARTZ.
CHARLES J. HUBER.